(12) United States Patent
Aaron et al.

(10) Patent No.: US 10,845,913 B1
(45) Date of Patent: Nov. 24, 2020

(54) TOUCH SENSITIVITY FOR ROBOTICALLY OPERATED DISPLAYS

(71) Applicant: INTERNATIONAL BUSINESS MACHINES CORPORATION, Armonk, NY (US)

(72) Inventors: Andrew Aaron, Ardsley, NY (US); Emrah Akin Sisbot, Pleasantville, NY (US); Mark E. Podlaseck, Kent, CT (US); Hyun Kyu Seo, Austin, TX (US); David O. S. Melville, New York, NY (US); Kenneth B. Ocheltree, Ossining, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/419,238

(22) Filed: May 22, 2019

(51) Int. Cl.
*B25J 13/08* (2006.01)
*G06F 3/041* (2006.01)

(52) U.S. Cl.
CPC .......... *G06F 3/0414* (2013.01); *B25J 13/081* (2013.01); *G06F 3/0418* (2013.01); *G06F 2203/04104* (2013.01)

(58) Field of Classification Search
CPC ..... H02K 11/24; B25J 13/085; G06F 3/04144
See application file for complete search history.

(56) References Cited

U.S. PATENT DOCUMENTS

| 7,545,108 | B2 | 6/2009 | Flessas | |
|---|---|---|---|---|
| 9,102,057 | B2 | 8/2015 | Fudaba et al. | |
| 9,114,531 | B2 | 8/2015 | Fudaba et al. | |
| 9,174,345 | B2 | 11/2015 | Cho et al. | |
| 9,823,693 | B2 | 11/2017 | Flessas | |
| 2002/0050984 | A1* | 5/2002 | Roberts | G06F 3/041 345/173 |
| 2007/0177339 | A1* | 8/2007 | Flessas | G06F 1/1601 361/679.06 |
| 2012/0105742 | A1 | 5/2012 | Davis et al. | |
| 2014/0168153 | A1* | 6/2014 | Deichmann | G06F 3/044 345/174 |
| 2014/0343729 | A1* | 11/2014 | Fudaba | B25J 13/00 700/261 |

FOREIGN PATENT DOCUMENTS

CN 102879687 B 11/2014

* cited by examiner

*Primary Examiner* — Roy P Rabindranath
(74) *Attorney, Agent, or Firm* — Tutunjian & Bitetto, P.C.; Vazken Alexanian

(57) ABSTRACT

A touch detection system is provided. The touch detection system includes a hardware processor. The touch detection system further includes a touch input surface mounted using a set of torque sensors, where a location of a touch on the touch input surface is calculated by the hardware processor based on collective results from the set of torque sensors, the touch comprising a user input.

18 Claims, 12 Drawing Sheets

TOUCH SENSITIVITY FOR ROBOTICALLY OPERATED DISPLAYS

BACKGROUND

The present invention generally relates to display devices, and more particularly to touch sensitivity for displays including, but not limited to, robotically operated displays.

With the advent of thinner and lighter displays, it is possible to mount them on moving systems. Such displays can be configured in multiple ways, such as, for example: ganged together to create large continuous surfaces; divided into individual displays; or angled together to envelop the viewer. The displays can be operated on robotic arms for precision placement by the user. When the displays are used for interactive systems, a touch-sensitive surface is typically needed for user feedback. Modern touchscreens may use mechanical, optical, or electrical sensing. In some cases, for example, the screen is covered with an X-Y grid of invisible wires. Since the finger is a conductor, the grid can detect its position. Another method is to place a row of LED lights along the edge of the display with corresponding sensors on the opposite side. A finger breaks the light beam and its position is therefore detected.

However, current touch-sensitive displays have drawbacks in such an environment. For example, current touch-sensitive displays may (a) add weight, (b) require a light-sensing device that adds a border to the display, and (c) require extra cabling to transmit the touch signal. Thus, there is a need for an improved approach for using a touch-sensitive display in the above and other environments.

SUMMARY

According to an aspect of the present invention, a touch detection system is provided. The touch detection system includes a hardware processor. The touch detection system further includes a touch input surface mounted using a set of torque sensors, where a location of a touch on the touch input surface is calculated by the hardware processor based on collective results from the set of torque sensors, the touch comprising a user input.

According to another aspect of the present invention, a computer-implemented method is provided for touch detection for a touch input surface mounted using a set of torque sensors. The method includes receiving, by a hardware processor, collective results from the set of torque sensors. The method further includes calculating, by the hardware processor, a location of a touch on the touch input surface based on the collective results from the set of torque sensors, the touch comprising a user input.

According to yet another aspect of the present invention, a computer program product is provided for touch detection for a touch input surface mounted using a set of force sensors. The computer program product includes a non-transitory computer readable storage medium having program instructions embodied therewith. The program instructions are executable by a computer to cause the computer to perform a method. The method includes receiving, by a hardware processor, collective results from the set of force sensors. The method further includes calculating, by the hardware processor, a location of a touch on the touch input surface based on the collective results from the set of force sensors, the touch comprising a user input.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

The present invention is directed to touch sensitivity for robotically operated displays or other touch sensitive devices.

In an embodiment, a touch-sensitive display is provided that sidesteps the aforementioned problems by using capabilities that are already present in a robotic arm capable of being used to position the touch-sensitive display.

While one or more embodiments describe the present invention relative to robotic arms on which displays are mounted, other moveable assemblies can also be used, as ready appreciated by one of ordinary skill in the art, while maintaining the spirit of the present invention.

Figure 1:
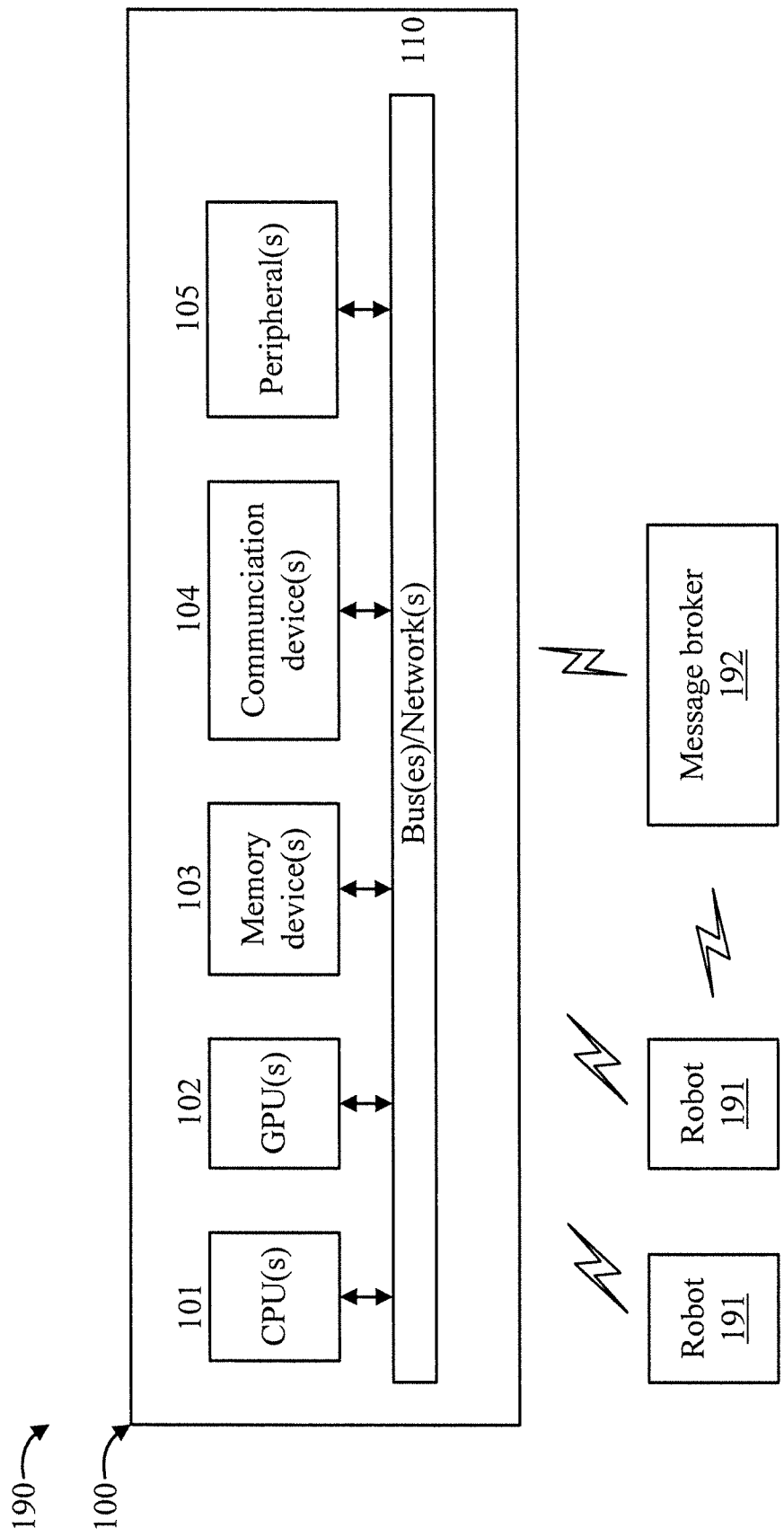
FIG. 1 is a block diagram showing an exemplary processing system to which the present invention may be applied, in accordance with an embodiment of the present invention.

FIG. 1 is a block diagram showing an exemplary processing system 100 to which the present invention may be applied, in accordance with an embodiment of the present invention. The processing system 100 includes a set of processing units (e.g., CPUs) 101, a set of GPUs 102, a set of memory devices 103, a set of communication devices 104, and set of peripherals 105. The CPUs 101 can be single or multi-core CPUs. The GPUs 102 can be single or multi-core GPUs. The one or more memory devices 103 can include caches, RAMs, ROMs, and other memories (flash, optical, magnetic, etc.). The communication devices 104 can include wireless and/or wired communication devices (e.g., network (e.g., WIFI, etc.) adapters, etc.). The peripherals 105 can include a display device, a user input device, a printer, an imaging device, and so forth. Elements of processing system 100 are connected by one or more buses or networks (collectively denoted by the figure reference numeral 110).

In an embodiment, memory devices 103 can store specially programmed software modules in order to transform the computer processing system into a special purpose computer configured to implement various aspects of the present invention. In an embodiment, special purpose hardware (e.g., Application Specific Integrated Circuits, and so forth) can be used to implement various aspects of the present invention.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. Further, in another embodiment, a cloud configuration can be used (e.g., see FIGS. 11-12). These and other variations of the processing system 100 are readily contemplated by one of ordinary skill in the art given the teachings of the present invention provided herein.

Moreover, it is to be appreciated that various figures as described below with respect to various elements and steps relating to the present invention that may be implemented, in whole or in part, by one or more of the elements of system 100.

Computer processing system 100 can be used to control and interface with robots 191 for use in accordance with the present invention. Computer processing system 100 can also be used to interface with a message broker 192. Accordingly, computer processing system 100, along with the robots 191, can be part of a touch detection system 190 in accordance with the present invention. Moreover, in an embodiment, the message broker 192 can be part of touch detection system 190. In an embodiment, one or more elements such as, for example, but not limited to, the message broker 192, can be implemented using a cloud configuration (e.g., see FIGS. 11-12). These and other variations of a touch detection system in accordance with the present invention are readily determined by one of ordinary skill in the art, while maintaining the spirit of the present invention.

Figure 2:
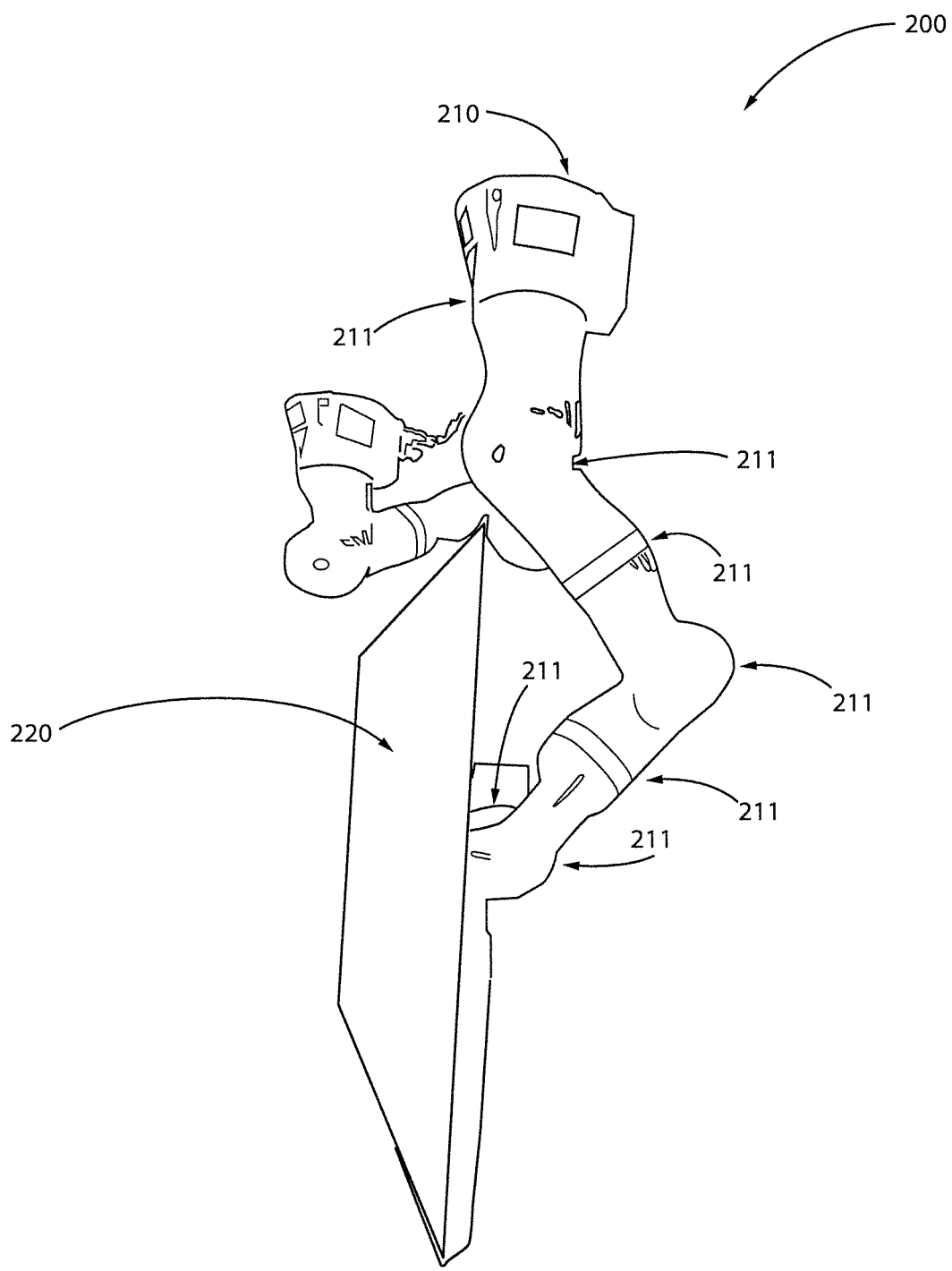
FIG. 2 is a diagram showing an exemplary environment to which the present invention can be applied, in accordance with an embodiment of the present invention.

FIG. 2 is a diagram showing an exemplary environment 200 to which the present invention can be applied, in accordance with an embodiment of the present invention.

The environment 200 includes a robotic arm 210 supporting a display 220. The robotic arm 210 includes multiple joints 211. The robotic arm 210 allows the display 220 to be variably positioned. The display 220 can be non-touch-sensitive (and thus less costly than a touch-sensitive display), since touch locations and their corresponding inputs are determined based on torques imposed on the multiple joints of the robotic arm 210 and not by the display 220 itself.

Figure 3:
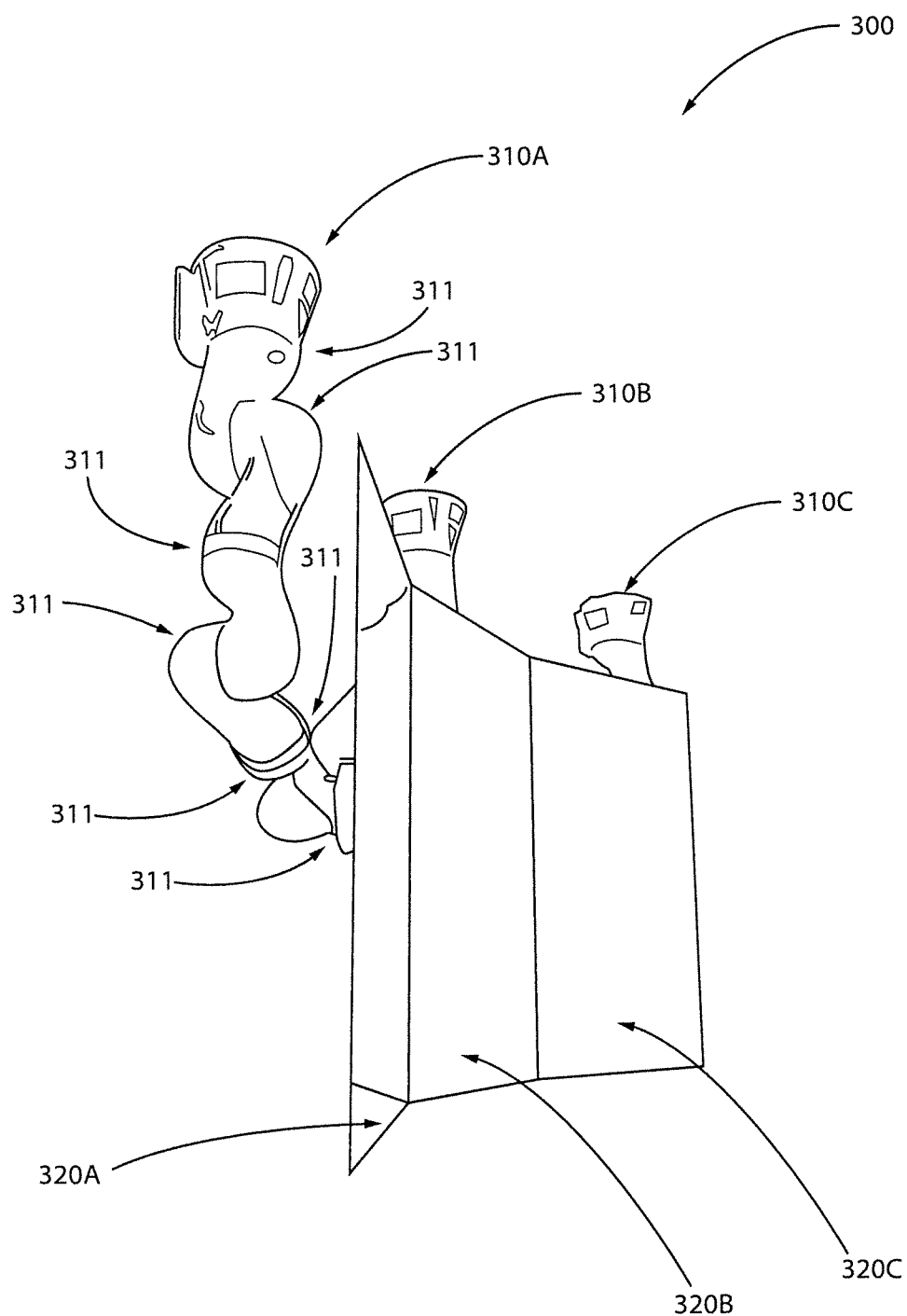
FIG. 3 is a diagram showing another exemplary environment to which the present invention can be applied, in accordance with an embodiment of the present invention.

FIG. 3 is a diagram showing another exemplary environment 300 to which the present invention can be applied, in accordance with an embodiment of the present invention.

The environment 300 includes a set of three robotic arms 310A, 310B, and 310C, each supporting a respective display 320A, 320B, and 320C, in order to provide the illusion of a larger display surface. That is, the robotic arms 310A, 310B, and 310C allow the displays 320A, 320B, and 320C to be positioned to form a single functional integrated surface. Each of the robotic arms 310A, 310B, and 310C include multiple joints 311.

The displays 320A, 320B, and 320C can be non-touch-sensitive (and thus less costly than a touch-sensitive display), since touch locations and their corresponding inputs are determined based on torques imposed on the multiple joints of the robotic arms 310A, 310B, and 310C and not by the displays 320A, 320B, and 320C themselves.

Figure 4:
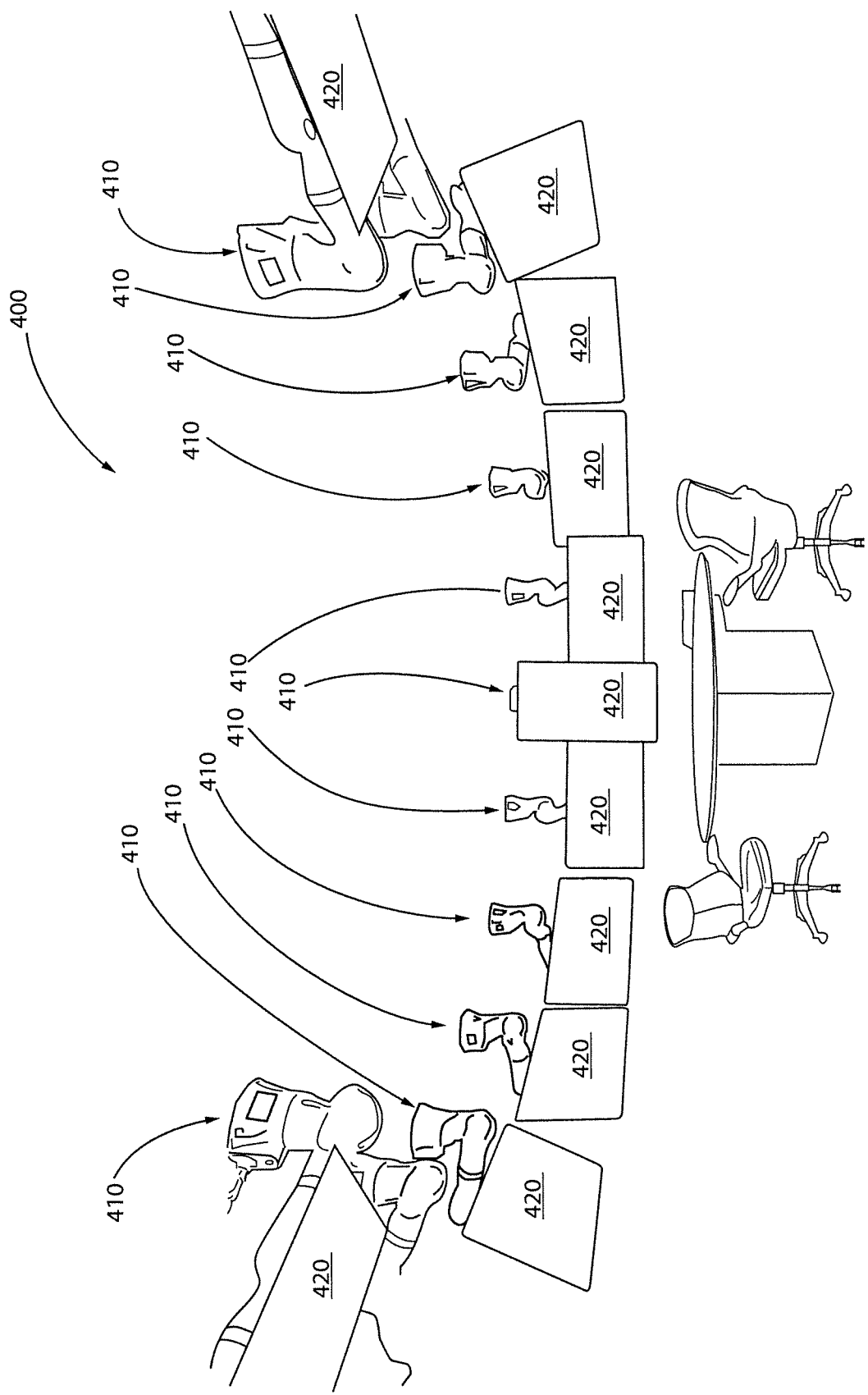
FIG. 4 is a diagram showing yet another exemplary environment to which the present invention can be applied, in accordance with an embodiment of the present invention.

FIG. 4 is a diagram showing yet another exemplary environment 400 to which the present invention can be applied, in accordance with an embodiment of the present invention.

The environment 400 includes multiple robotic arms (individually and collectively denoted by the figure reference numeral 410), each supporting a respective display (individually and collectively denoted by the figure reference numeral 420). Each of the robotic arms 410 includes multiple joints. The multiple robotic arms 410 can be readily configured to pose in the displays in a myriad of positions.

The displays 420 can be non-touch-sensitive (and thus less costly than a touch-sensitive display), since touch locations and their corresponding inputs are determined based on torques imposed on the multiple joints of the robotic arms 410 and not by the displays 410 themselves.

Figure 5:
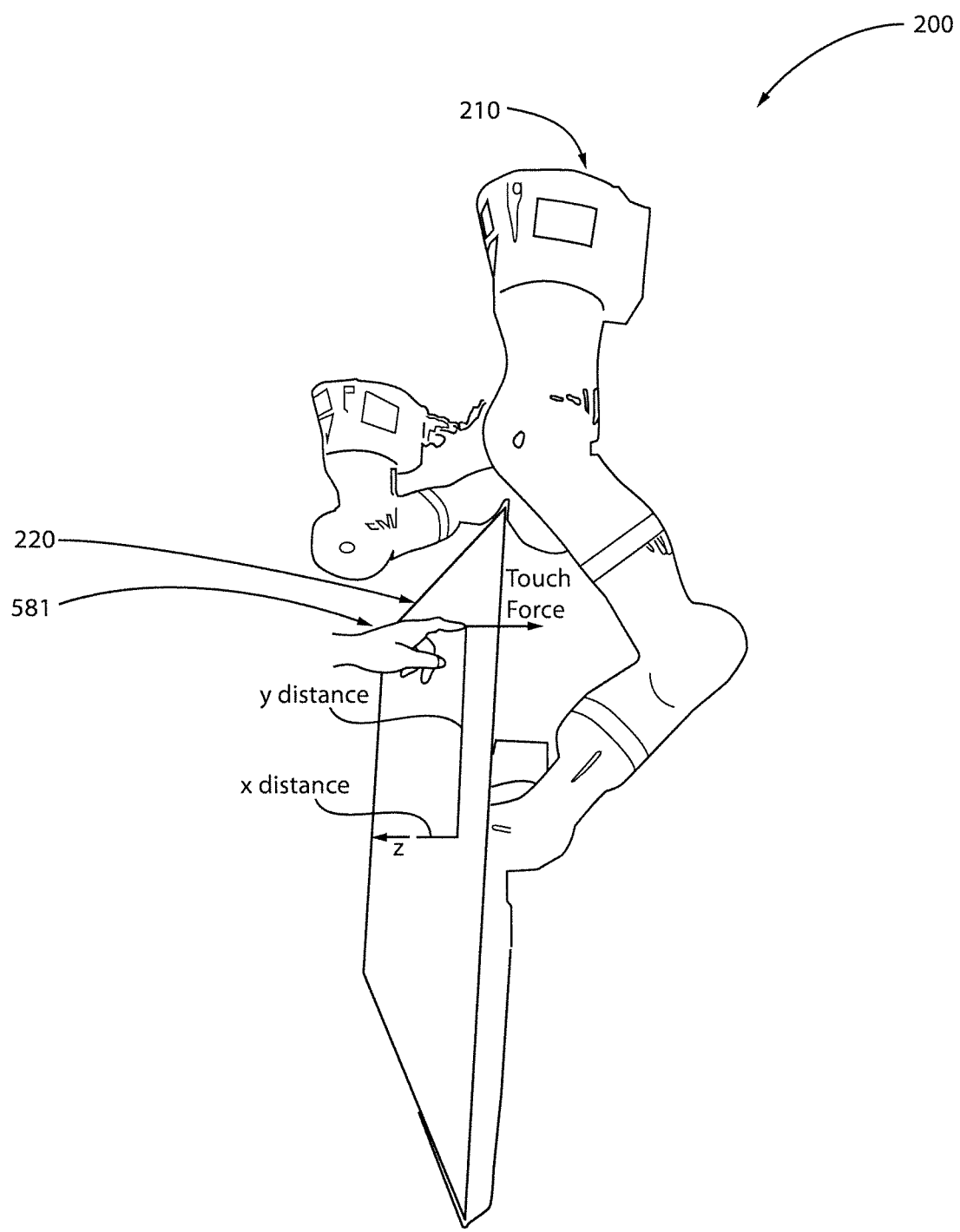
FIG. 5 is a diagram showing the environment of FIG. 2, with X and Y touch forces labeled, in accordance with an embodiment of the present invention.

FIG. 5 is a diagram showing the environment 200 of FIG. 2, with X and Y touch forces labeled, in accordance with an embodiment of the present invention.

When a user presses a finger 581 anywhere on the screen there is a touch force that generated at the point of contact as shown in FIG. 5. The touch force is displaced from the center of the display by a set of x and y displacements as shown in FIG. 5. The displacements of x horizontal distance and y vertical distance produce torques about the center of the display attachment.

Figure 6:
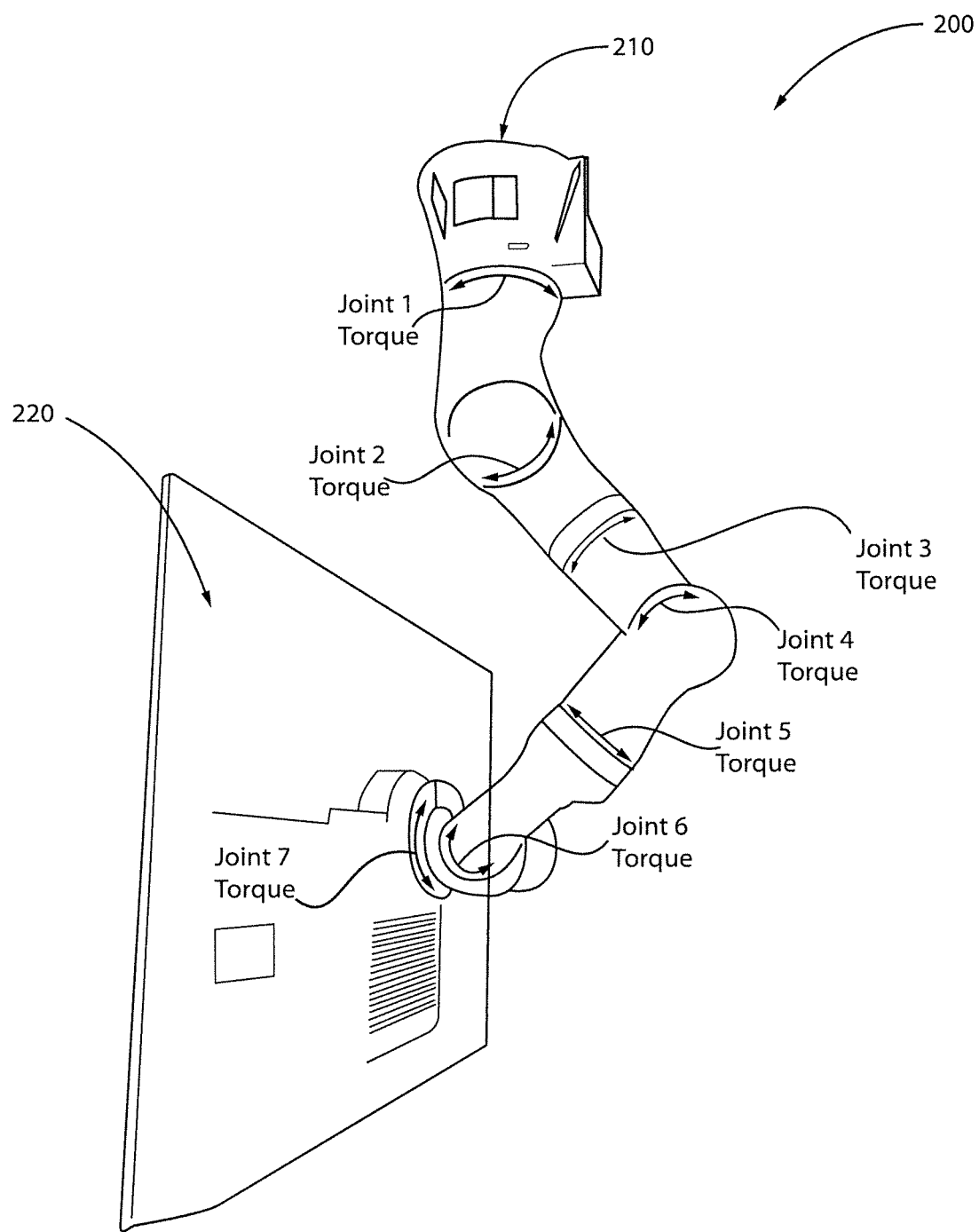
FIG. 6 is a diagram showing the environment of FIG. 2, with all joint torques labeled for the robotic arm, in accordance with an embodiment of the present invention.

These torques produced by the force on the touch screen can be sensed by the torque sensors in each of the robot arms joints that are shown in FIG. 6. FIG. 6 is a diagram showing the environment 200 of FIG. 2, with all joint torques labeled for the robotic arm 210, in accordance with an embodiment of the present invention. The robotic arm includes seven joints (joint 1 through joint 7) for which torque values can be calculated.

Each robot joint is at a displacement from the location that the force is applied and the product of that displacement distance by the applied force in a perpendicular direction gives the torque on each of the robot joints. By dividing the torques measured on each of the joints by the displacement from the center of the display, the effective force applied at the center of the display is calculated. The effective torques summed about the display mounting point are also calculated.

While the following implementation has described using multiple torque sensors and calculating the forces to produce a stream of torque and force data, an alternative implementation is to use multiple force sensors and to calculate the torque values from the force sensors and the distance from the force sensors. This is an alternative means for producing the stream of force and torque sensor data.

The perpendicular distance from the pivot point in X, Y, Z coordinates can be calculated using the formula distance=torque/force. The calculated distance can be used to determine the position of touch on any side of the mounted display (front, back, top, side) and, together with force and torque values in time, can be used to detect advanced (complex) touch interactions such as push, pull, swipe, double-tap, and so forth. As used herein, an advanced or complex touch refers to a user action involving more than a single touch (e.g., touch and swipe right, touch and swipe left, pinch, double touch, push, pull, and so forth). How much torque person exerts on an object depends on the amount of force and the lever arm (aka moment arm). The lever arm is the perpendicular distance from the display mounting point to the point where force is exerted.

The robot arm produces a stream of force and torque sensor data. This streaming data may be published to a message broker. A detection system subscribes to the streaming data and calculates the perpendicular distance. The data may be noisy or have sharp impulses in it. Depending on the speed of data streaming and amount of data noisiness, better results may be obtained by using data smoothing algorithms. Exemplary data smoothing algorithms which can be used include, but are not limited to, moving average, Savitzky-Golay, and/or a Butterworth Low Pass. The calculated perpendicular distance represents the coordinates of a touch in space.

Figure 7:
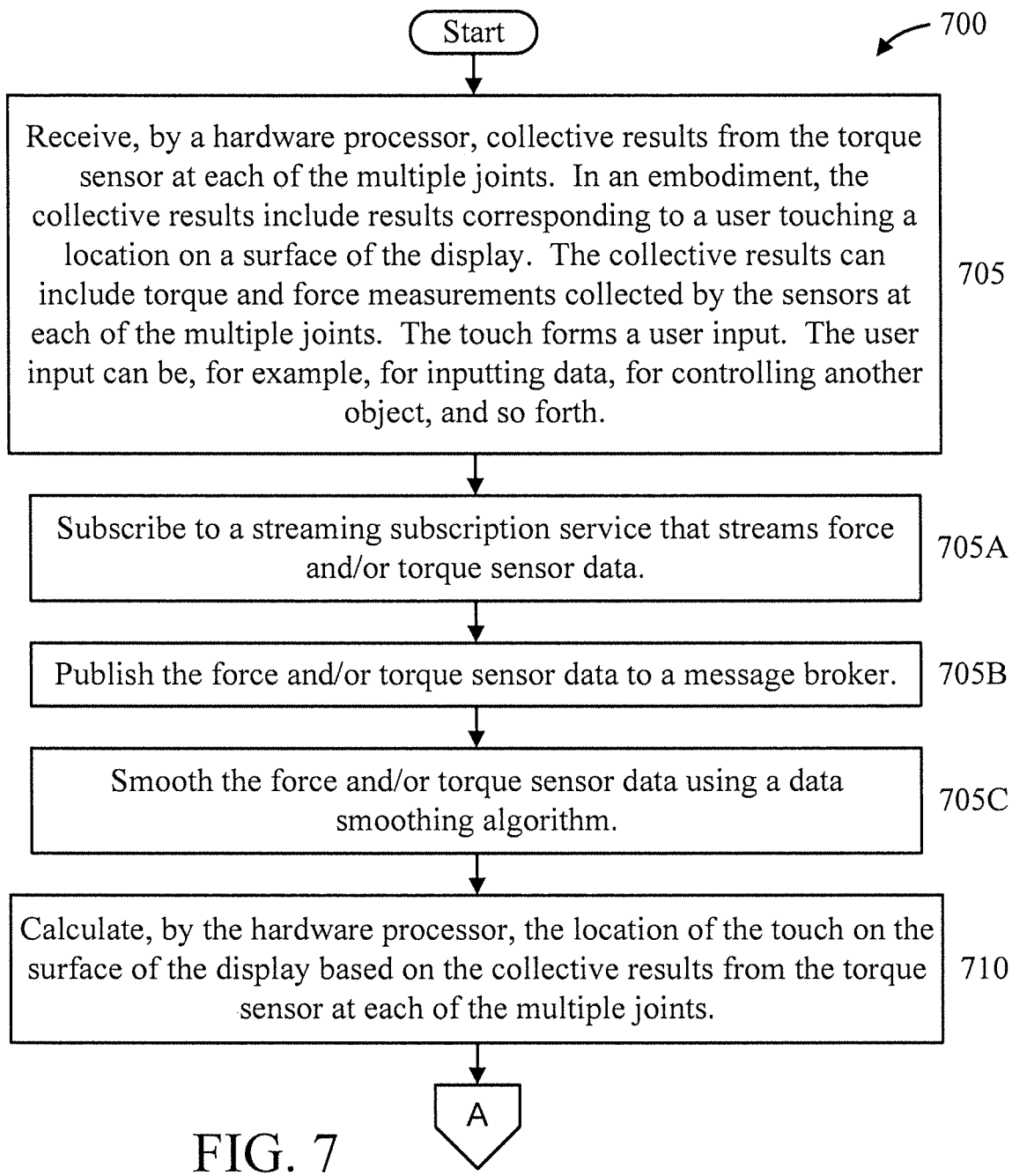
FIGS. 7-8 are flow diagrams showing an exemplary method for providing touch sensitivity for robotically operated non-touch-screen displays, in accordance with an embodiment of the present invention.
Figure 8:
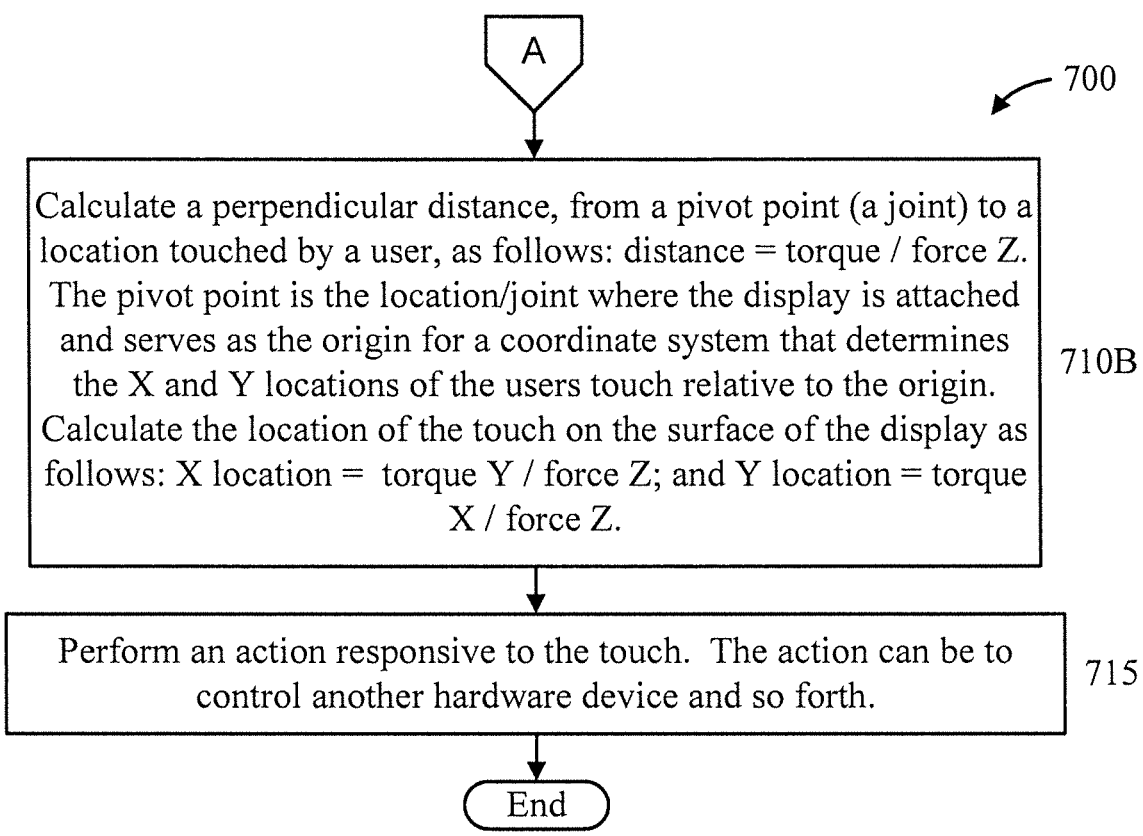

FIGS. 7-8 are flow diagrams showing an exemplary method 700 for providing touch sensitivity for robotically operated non-touch-screen displays, in accordance with an embodiment of the present invention. Method 700 is performed with respect to at least one robotic arm. Each robotic arm has multiple joints. Each of the multiple joints has a respective torque sensor.

At block 705, receive, by a hardware processor, collective results from the torque sensor at each of the multiple joints. In an embodiment, the collective results include results corresponding to a user touching a location on a surface of the display. The collective results can include torque and force measurements collected by the sensors at each of the multiple joints. The touch forms a user input. The user input can be, for example, for inputting data, for controlling another object, and so forth.

In an embodiment, block 705 can include one or more of blocks 705A through 705CB.

At block 705A, subscribe to a streaming subscription service that streams force and/or torque sensor data.

At block 705B, publish the force and/or torque sensor data to a message broker.

At block 705C, smooth the force and/or torque sensor data using a data smoothing algorithm. For example, a moving average algorithm, a Savitzky-Golay algorithm, and/or a Butterworth Low Pass algorithm can be used.

At block 710, calculate, by the hardware processor, the location of the touch on the surface of the display based on the collective results from the torque sensor at each of the multiple joints.

In an embodiment, block 710 can include blocks 710A.

At block 710A, calculate a perpendicular distance, from a pivot point (a joint) to a location touched by a user, as follows: distance=torque/force Z. The pivot point is the location/joint where the display is attached and serves as the origin for a coordinate system that determines the X and Y locations of the users touch relative to the origin. Thus, in an embodiment, calculate the location of the touch on the surface of the display as follows: X location=torque Y/force Z; and Y location=torque X/force Z.

It is to be appreciated that complex touch interactions involving more than a single touch can also be detected. For example, the following complex touch interactions can be detected by the present invention: a double touch, a touch and a swipe, a pull, and a push. These interactions can be detected as follows.

At block 715, combine multiple touches with forces in the X and Y direction to provide multiple touches, side pushes, pulls, and swipes.

At block 720, perform an action responsive to the touch. The action can be to control another hardware device and so forth.

Further regarding block 710, the following numerical example is provided for the sake of illustration. To that end, a user touches the display 220 on a point P, resulting in torques in the joints of the robotic arm 210 to which the display 220 is mounted. For example, for a user pressing on the front of a display with a force of −12.1 Newton (Force Z) where there is a torque about the X axis of 1.464 Newton-meters (Torque X) and a torque about the Y axis of −2.225 Newton-meters (Torque Y) would indicate a touch location relative to the center of the display of X=Torque Y/Force Z=−2.225/12.1=−0.184 meters and Y=Torque X/Force Z=1.464/12.1=0.120 meters.

More complex touches can be localized as mentioned above. A touch is determined by a filtered force in the negative Z direction, according to FIG. 5, that exceeds a selected touch force threshold on the order of 2 Newtons in the negative direction. Once the threshold is exceeded for the force in the Z direction, the X and Y components of the torque can then be used to calculate the specific displacement of the touch in the X and Y directions as outlined above.

As an example, for detecting a swipe gesture, using the coordinate system as defined in FIG. 5, a swipe along the right side of the screen could be determined by a negative force in the X direction exceeding a threshold with a torque about the Z axis going from a large positive value to a large negative value, reflecting moving a hand on the side of the display from the top to the bottom.

As a further example, a pull on the bottom of the screen can be determined by detecting a large positive Z force according to FIG. 5, which would indicate a pull, coupled with a torque about the X axis exceeding a given threshold.

As a further example, a push upwards on the bottom of the display can be detected by a force in the positive Y direction exceeding a threshold along with a small torque about the X axis since the center of the display has a small displacement from the robot flange where the torques are measured.

A description will now be given regarding two further exemplary environments 900 and 1000 to which the present invention can be applied, in accordance with various embodiments of the present invention. The environments 900 and 1000 are described below with respect to FIGS. 9 and 10, respectively. In further detail, the environment 900 includes a touch sensitive control system operatively coupled to a controlled system, while the environment 1000 includes a touch sensitive control system as part of a controlled system. Moreover, any of environments 900 and 1000 can be part of a cloud-based environment (e.g., see FIGS. 11 and 12). These and other environments to which the present invention can be applied are readily determined by one of ordinary skill in the art, given the teachings of the present invention provided herein, while maintaining the spirit of the present invention.

Figure 9:
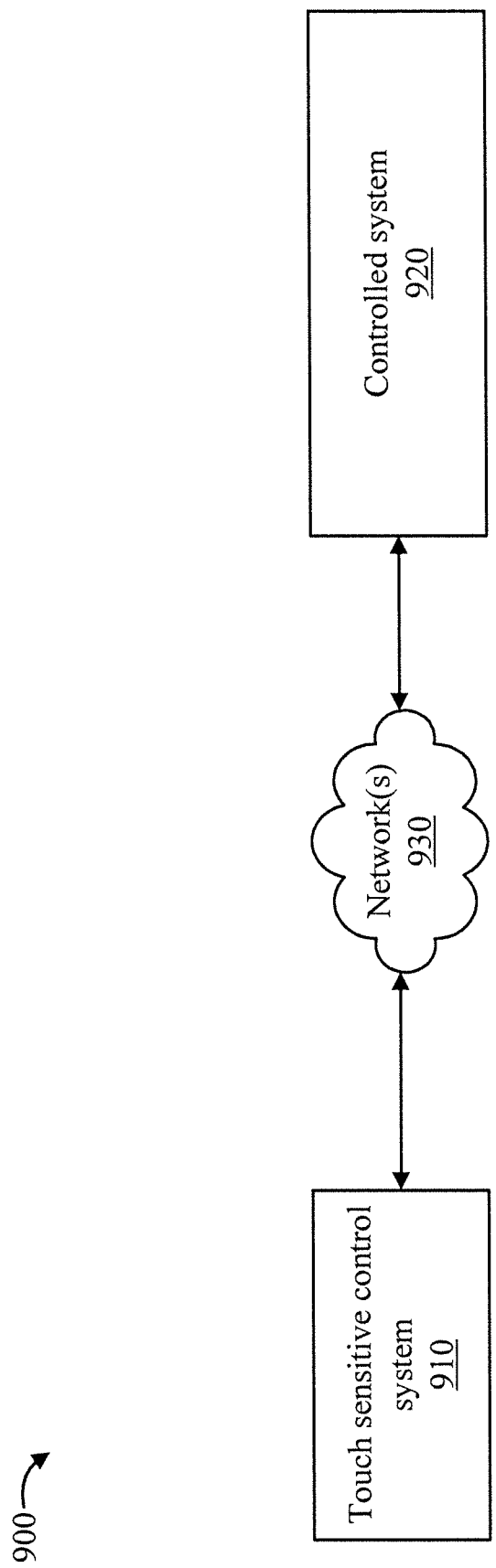
FIG. 9 is a block diagram showing a further exemplary environment to which the present invention can be applied, in accordance with an embodiment of the present invention.

FIG. 9 is a block diagram showing a further exemplary environment 900 to which the present invention can be applied, in accordance with an embodiment of the present invention.

The environment 900 includes a touch sensitive control system 910 and a controlled system 920. The touch sensitive control system 910 and the controlled system 920 are configured to enable communications therebetween. For example, transceivers and/or other types of communication devices including wireless, wired, and combinations thereof can be used. In an embodiment, communication between the touch sensitive control system 910 and the controlled system 920 can be performed over one or more networks, collectively denoted by the figure reference numeral 930. The communication can include, but is not limited to, streaming force and torque sensor data and action initiation control signals from the touch sensitive control system 920. The controlled system 920 can be any type of processor-based system such as, for example, but not limited to, an assembly line based manufacturing system and so forth.

In an embodiment, the action initiation control signals 910 can be implemented as a node in a cloud-computing arrangement. In an embodiment, a single action initiation control signals 910 can be assigned to a single controlled system or to multiple controlled systems e.g., different robots in an assembly line, and so forth). These and other configurations of the elements of environment 900 are readily determined by one of ordinary skill in the art given the teachings of the present invention provided herein, while maintaining the spirit of the present invention.

Figure 10:
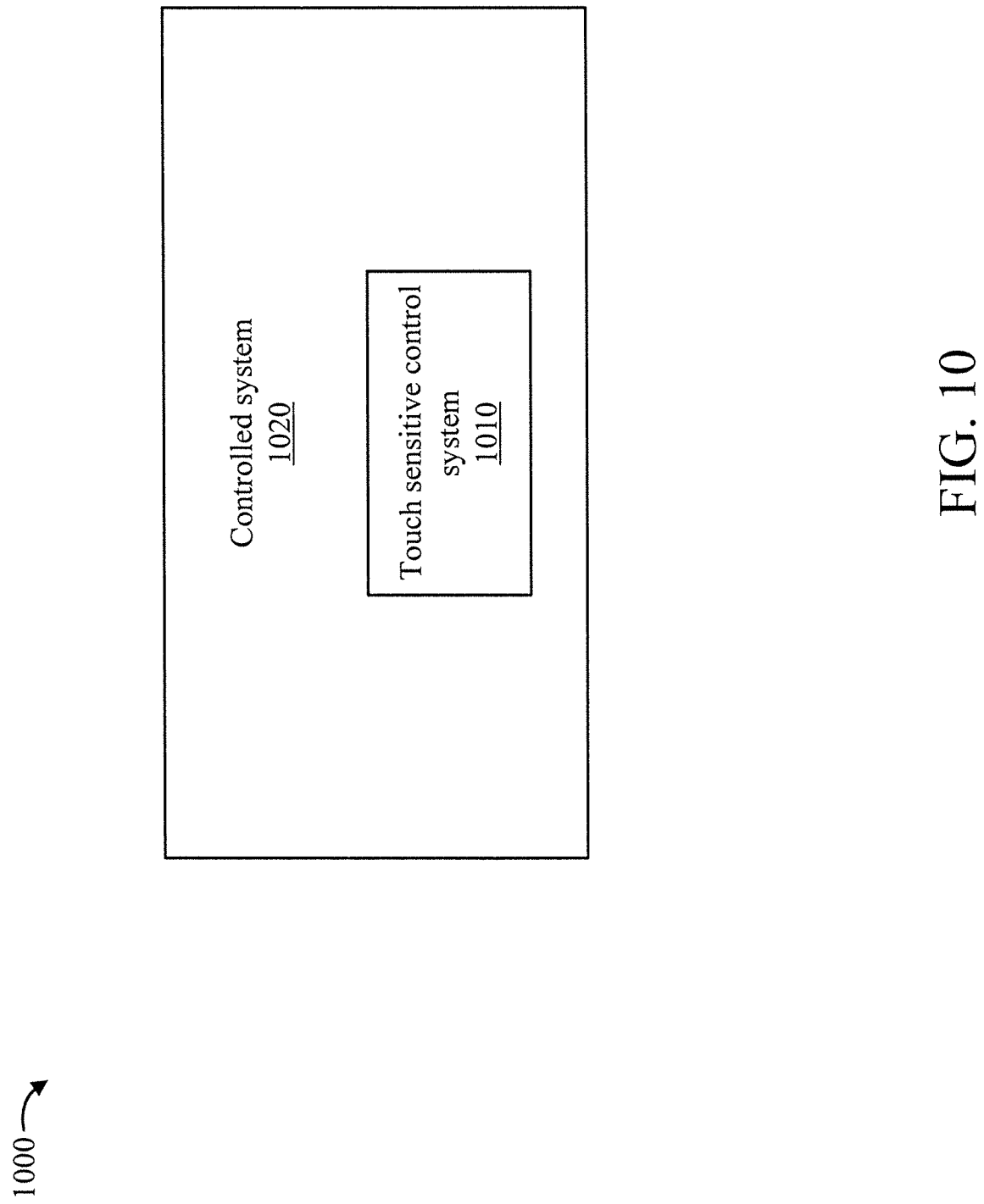
FIG. 10 is a block diagram showing a yet further exemplary environment to which the present invention can be applied, in accordance with an embodiment of the present invention.

FIG. 10 is a block diagram showing another exemplary environment 1000 to which the present invention can be applied, in accordance with an embodiment of the present invention.

The environment 1000 includes a controlled system 1020 that, in turn, includes a touch sensitive control system 1010. One or more communication buses and/or other devices can be used to facilitate inter-system, as well as intra-system, communication. The controlled system 1020 can be any type of processor-based system such as, for example, but not limited to, a manufacturing system (e.g., an assembly line) and so forth.

Other than system 1010 being included in system 1020, operations of these elements in environments 900 and 1000 are similar. Accordingly, elements 1010 and 1020 are not described in further detail relative to FIG. 10 for the sake of brevity, with the reader respectively directed to the descriptions of elements 910 and 920 relative to environment 900 of FIG. 9 given the common functions of these elements in the two environments 900 and 1000.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and tablets).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 11:
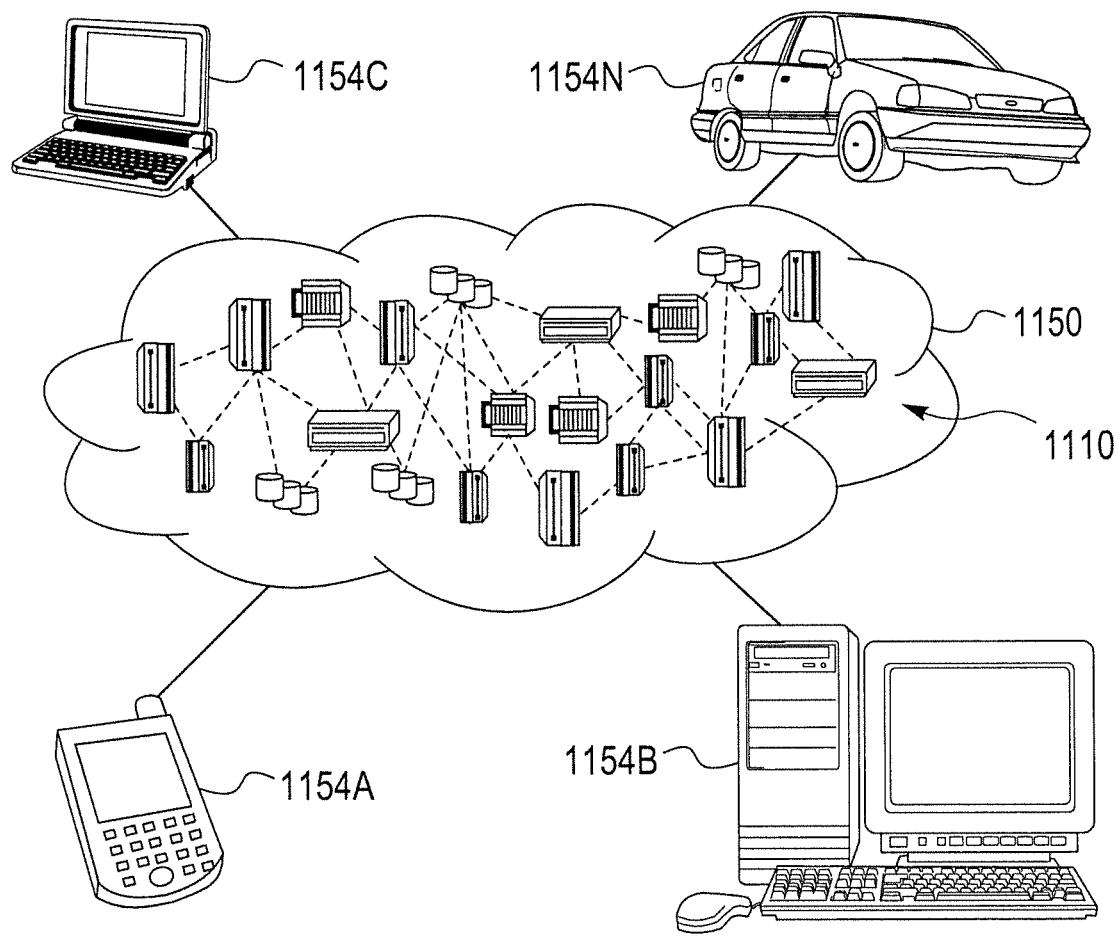
FIG. 11 is a block diagram showing an illustrative cloud computing environment having one or more cloud computing nodes with which local computing devices used by cloud consumers communicate, in accordance with an embodiment of the present invention.

Referring now to FIG. 11, illustrative cloud computing environment 1150 is depicted. As shown, cloud computing environment 1150 includes one or more cloud computing nodes 1110 with which local computing devices used by cloud consumers, such as, for example, personal digital assistant (PDA) or cellular telephone 1154A, desktop computer 1154B, laptop computer 1154C, and/or automobile computer system 1154N may communicate. Nodes 1110 may communicate with one another. They may be grouped (not shown) physically or virtually, in one or more networks, such as Private, Community, Public, or Hybrid clouds as described hereinabove, or a combination thereof. This allows cloud computing environment 1150 to offer infrastructure, platforms and/or software as services for which a cloud consumer does not need to maintain resources on a local computing device. It is understood that the types of computing devices 1154A-N shown in FIG. 11 are intended to be illustrative only and that computing nodes 1110 and cloud computing environment 1150 can communicate with any type of computerized device over any type of network and/or network addressable connection (e.g., using a web browser).

Figure 12:
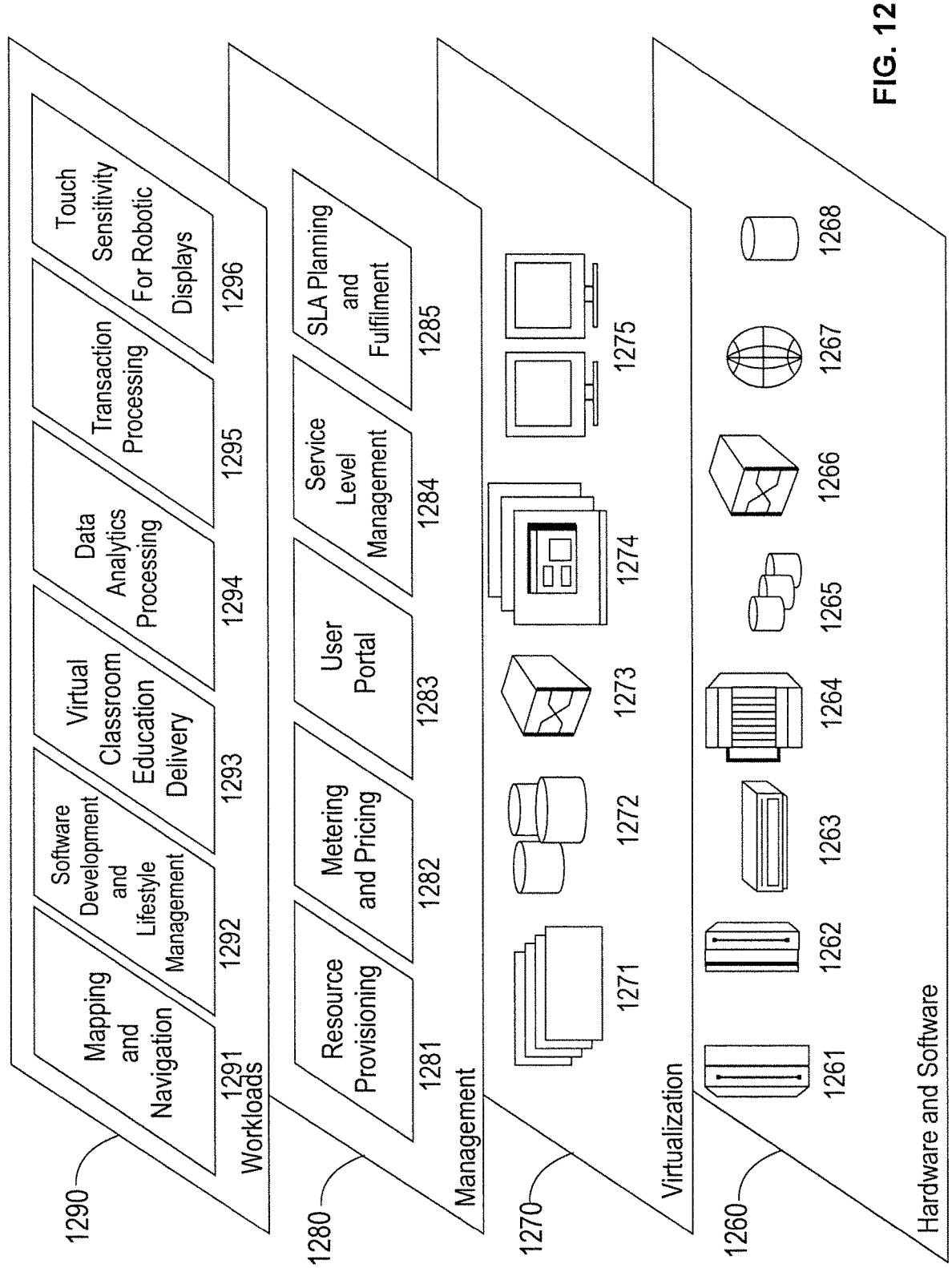
FIG. 12 is a block diagram showing a set of functional abstraction layers provided by a cloud computing environment, in accordance with an embodiment of the present invention.

Referring now to FIG. 12, a set of functional abstraction layers provided by cloud computing environment 1150 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 1260 includes hardware and software components. Examples of hardware components include: mainframes 1261; RISC (Reduced Instruction Set Computer) architecture based servers 1262; servers 1263; blade servers 1264; storage devices 1265; and networks and networking components 1266. In some embodiments, software components include network application server software 1267 and database software 1268.

Virtualization layer 1270 provides an abstraction layer from which the following examples of virtual entities may be provided: virtual servers 1271; virtual storage 1272; virtual networks 1273, including virtual private networks; virtual applications and operating systems 1274; and virtual clients 1275.

In one example, management layer 1280 may provide the functions described below. Resource provisioning 1281 provides dynamic procurement of computing resources and other resources that are utilized to perform tasks within the cloud computing environment. Metering and Pricing 1282 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1283 provides access to the cloud computing environment for consumers and system administrators. Service level management 1284 provides cloud computing resource allocation and management such that required service levels are met. Service Level Agreement (SLA) planning and fulfillment 1285 provide pre-arrangement for, and procurement of, cloud computing resources for which a future requirement is anticipated in accordance with an SLA.

Workloads layer 1290 provides examples of functionality for which the cloud computing environment may be utilized. Examples of workloads and functions which may be provided from this layer include: mapping and navigation 1291; software development and lifecycle management 1292; virtual classroom education delivery 1293; data analytics processing 1294; transaction processing 1295; and touch sensitivity for robotic displays 1296.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B 1). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A touch detection system, comprising:
   a hardware processor; and
   a touch input surface mounted to a moveable assembly having multiple joints using a set of torque sensors, each of the multiple joints having a torque sensor from the set, where a location of a touch on the touch input surface is calculated by the hardware processor based on collective results from the torque sensor at each of the multiple joints, the touch comprising a user input.

2. The system of claim 1, wherein the set of sensors produces a stream of force and torque sensor data.

3. The system of claim 2, further comprising a message broker for providing a streaming subscription service for the stream of force and torque sensor data, and wherein the touch detection system is subscribed to the streaming subscription service.

4. The system of claim 2, wherein the at least one hardware processor smooths the stream of force and torque sensor data using a data smoothing method.

5. The system of claim 1, wherein the moveable assembly is a robotic arm.

6. The system of claim 1, wherein the touch input surface is comprised in a display, and the system further comprises at least one additional moveable assembly, each having an attached display and multiple joints, each of the multiple joints of the at least one additional moveable assembly having a torque sensor, wherein the display attached to the moveable assembly and the display attached to the at least one additional moveable assembly are arranged to functionally provide a single integrated display surface.

7. The system of claim 1, wherein a center portion of the touch input surface is attached to a particular one of the multiple joints to detect displacement of at least the particular one of the multiple joints responsive to the touch.

8. The system of claim 1, wherein the hardware processor detects complex touch interactions involving more than a single touch.

9. The system of claim 8, wherein the complex touch interactions are selected from the group consisting of a double touch, a touch and a swipe, a pull, and a push.

10. The system of claim 1, wherein the hardware processor calculates the location of the touch on the touch input surface by dividing torques imposed on the set of torque sensors by an applied amount of force resulting from the touch.

11. The system of claim 1, wherein the touch input surface is comprised in a non-touch-screen display.

12. The system of claim 1, wherein the touch input surface is comprised in a keypad.

13. A computer-implemented method for touch detection for a touch input surface mounted using a set of torque sensors, the method comprising:

receiving, by a hardware processor, collective results from the set of torque sensors, wherein the touch input surface is mounted to a moveable assembly having multiple joints, each of the multiple joints having a torque sensor from the set; and calculating, by the hardware processor, a location of a touch on the touch input surface based on the collective results from the torque sensor at each of the multiple joints, the touch comprising a user input.

14. The computer-implemented method of claim 13, wherein the set of torque sensors produces a stream of force and torque sensor data.

15. The computer-implemented method of claim 14, further comprising a message broker for providing a streaming subscription service for the stream of force and torque sensor data, and wherein the touch detection system is subscribed to the streaming subscription service.

16. The computer-implemented method of claim 14, further comprising smoothing the stream of force and torque sensor data.

17. The computer-implemented method of claim 13, wherein the moveable assembly is a robotic arm.

18. A computer program product for touch detection for a touch input surface mounted using a set of force sensors, the computer program product comprising a non-transitory computer readable storage medium having program instructions embodied therewith, the program instructions executable by a computer to cause the computer to perform a method comprising:

receiving, by a hardware processor, collective results from the set of torque sensors, wherein the touch input surface is mounted to a moveable assembly having multiple joints, each of the multiple joints having a torque sensor from the set; and calculating, by the hardware processor, a location of a touch on the touch input surface based on the collective results from the torque sensor at each of the multiple joints, the touch comprising a user input.

\* \* \* \* \*